June 4, 1968            W. FISHER            3,386,461
MULTI-PORT ORIFICE VALVE
Filed July 2, 1965
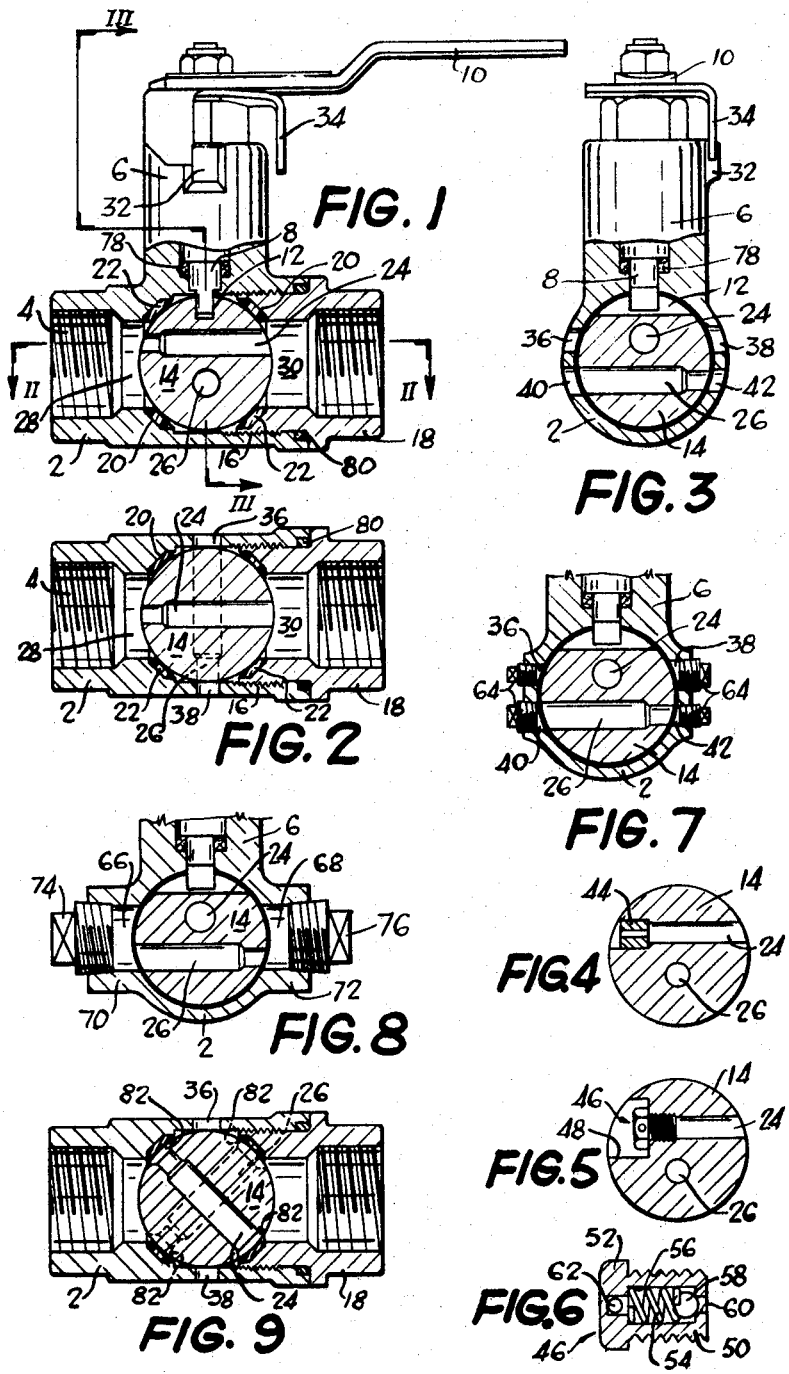
INVENTOR
W. FISHER
Fetherstonhaugh & Co.
ATTORNEYS

United States Patent Office 3,386,461
Patented June 4, 1968

3,386,461
MULTI-PORT ORIFICE VALVE
Walter Fisher, Pointe Claire, Quebec, Canada, assignor to Texaco Canadian Limited, Montreal, Quebec, Canada
Filed July 2, 1965, Ser. No. 469,189
16 Claims. (Cl. 137—237)

ABSTRACT OF THE DISCLOSURE

A valve having inlet and outlet openings and defining a fluid flow path therebetween and having a rotatable valve member located in the fluid flow path. The valve member includes a plurality of non-intersecting orifice ports passing therethrough and arranged so that while one of said orifice ports completes the fluid flow path between the inlet and outlet openings, the other of said orifice ports registers with apertures in the sides of the housing and free from communication with the fluid flow path so that the said other orifice ports can be cleaned or otherwise maintained while fluid flow continues through the first said orifice port.

---

The present invention relates to a valve, and particularly relates to a valve having two, or more, orifice ports therein.

The valve according to this invention is particularly useful in liquid or gaseous pipe line installations where interruption of flow is highly undesirable, and where even the briefest shut-down period, for cleaning or inspection, cannot be tolerated.

With the provision of two, or more, orifice ports it is possible to maintain one of the orifice ports in valve open or operational position, while the other orifice port is in valve closed or inoperational position and is accessible for inspection and cleaning purposes, or for changing the orifice opening size, depending upon the application.

In many installations it is absolutely necessary that fluid flow through a pipe line be uninterrupted, and to ensure that continuous flow is maintained it is necessary to inspect and clean the orifice ports in the valves at regular intervals. With known valves this orifice port inspection and cleaning operation necessitates a shut-down of flow in the line, and while the shut-down may have only the briefest duration, it is to be avoided if at all possible.

The primary object of the present invention then is to provide an in-line valve structure having two, or more, orifice ports therein, the provision of at least two orifice ports enabling inspection and cleaning of one port while the other port remains in operational or open position.

Another object of the invention is to provide a valve arrangement having dual orifice ports therein, and whereby the orifice openings may be regulated as to size without interrupting flow through the valve and without necessitating by-passing the valve.

In addition the apparatus of the invention may have as an object of the provision of a pressure relief mechanism for relieving excess pressure in a closed piping system.

The valve of this invention can be used for any process or utility service requiring an orifice for either controlling, limiting, throttling, or measuring a fluid flow which may require on-stream inspection or cleaning due to plugging, eroding, or corroding of the orifice. The features of this valve make it especially attractive to all continuous processes where an interruption or upset would be most undesirable.

The following are some specific applications for the valve:

(1) Orifice in fuel gas control valve by-pass to fired process heaters.
(2) Aeration taps for fluid catalytic cracking units.
(3) Gland oil system for pumps, etc.
(4) Purging air, gas, or oil systems.
(5) As an aid for cleaning and maintaining an uninterrupted air supply to pneumatic instruments which have fine orifices which tend to block, etc.

The valve of the invention is particularly applicable to the uses recited above, and it is a further object of the invention to provide a valve structure which will satisfy the requirements of these applications.

The structure of the valve according to the present invention will be explained in detail hereafter, and while a specific valve of dual-port construction is described, multiple port and other variations not specifically recited may be employed without departing from the spirit and scope of the invention.

A specific valve structure containing dual orifice ports is illustrated in the accompanying drawings wherein, FIGURE 1 illustrates a side partial sectional view of a specific valve;

FIGURE 2 illustrates a plan sectional view along line II—II of FIGURE 1;

FIGURE 3 illustrates an end partial sectional view along line III—III of FIGURE 1.

FIGURE 4 illustrates in side sectional view a valve ball according to the invention embodying a further modification.

FIGURE 5 illustrates in side sectional view a valve ball according to the invention but embodying a still further modification incorporating a pressure relief fitting.

FIGURE 6 is an enlarged section of a typical pressure relief fitting.

FIGURE 7 is an end view, similar to FIGURE 3, but illustrating threaded plugs applied to the cleaning holes in the body.

FIGURE 8 is an end view, similar to FIGURE 3, but illustrating an alternative execution for plugging the cleaning holes in the body.

FIGURE 9 is a plan sectional view, similar to FIGURE 2, but illustrating a modified valve ball rotated through 45°.

In FIGURES 1, 2 and 3, a valve housing or body shown at numeral 2 is provided with standard pipe tapping at 4 for reception of threaded pipe end (not shown), and is provided with an upstanding portion 6 to house a stem 8 projecting downwardly from valve handle 10 to engage a key slot 12 positioned in valve member or ball 14.

Valve body 2 is also tapped at 16 to receive threaded valve portion 18. With valve portion 18 threaded into valve body 2 a valve seat 20 is formed and the valve member 14 is supported therein by seat rings 22.

In FIGURES 1, 2 and 3 the axially rotatable valve member or ball 14 is shown provided with two fixed non-interconnecting orifice ports 24 and 26. The axes of the orifice ports are disposed at right angles, and the axis of each orifice port is disposed at an angle of about 90° to the axis of rotation of said rotatable valve member 14.

In the drawings the orifice port 24 is in operational port-open position whereby liquid or gaseous material flowing in the pipe, threaded into the valve body at 4, passes through orifice 24 and on into the pipe threaded into valve member 18; and orifice port 26 is in inoperational port-closed position being oriented at an angle of 90° to the flow and isolated from the flowing material in valve cavities 28 and 30 by the seat rings 22.

By rotating valve ball 14 on an axis perpendicular to the axes of orifice ports 24 and 26 through 90°, orifice port 26 becomes oriented in port-open position while orifice port 24 assumes port-closed position. The rotation of valve member 14 is accomplished by rotating handle 10 through 90° which imparts, through stem 8, a similar rotation to the member 14.

The portion 6 of valve housing 2 is provided with a stop abutment or member 32 and the stem and handle arrangement is provided with a flange or skirt 34 having a 90° cut-out therein to ensure that the alignment of the orifice ports is correct at all times.

The valve body 2 is provided with four inspection and cleaning apertures or holes 36, 38, 40 and 42 as shown in FIGURES 3 and 2. These holes are so positioned in valve body 2 that when valve member 14 is in the position shown in FIGURE 1, orifice port 26 is in line with holes 40 and 42 and inspection and cleaning of port 26 is easily accomplished. By rotating handle 10 clockwise, orifice port 24 assumes inoperational port closed position in coaxial register with apertures or holes 36 and 38 for inspection and cleaning while port 26 assumes operational port open position.

While 90° rotation of the valve ball 14 will place one orifice port in operational position and the other in inoperational position, the valve body, seat, and port diameters may be designated to permit complete shut-off at 45° rotation, in the event that such shut-off becomes necessary.

In FIGURES 1, 2 and 3 typical fixed size orifice ports 24 and 26 have been shown. With the accessibility of the valve ports provided by apertures 36, 38, 40 and 42 it is possible to adapt the ports in member 14 to receive interchangeable orifices to vary the orifice diameter to regulate the flow through the valve. Such a provision is shown in FIGURE 4, with a removable orifice insert shown at 44. The insert may be inserted into the port when the port is in register with the cleaning holes in the valve body 2, and may be threaded for reception by a tapped portion of the orifice port, or may simply be secured in the port by a press fit, or by other means.

The valve of this invention may also be used as a pressure relieving structure, by simply substituting a pressure relieving fitting for the orifice insert 44 shown in FIGURE 4, for relieving excess pressure in a closed piping system due to thermal expansion. In FIGURE 5 orifice port 24 is shown threaded to receive pressure relief fitting 46 and includes recess 48, of increased diameter, to receive the head of pressure relief fitting 46 and to provide suitable wrench clearance. A fitting 46 will also be added to orifice port 26.

FIGURE 6 shows an enlarged section of a typical pressure relief fitting 46 which includes threaded body portion 50 and hexagonal head portion 52. Compression spring 54 is positioned in bore 56 in body 50 and urges check ball 58 in closing engagement with inlet orifice 60. Outlet orifice 62 passes transversely through head 52 and communicates with bore 56. Spring 54 is designed to maintain ball 58 in closing engagement with inlet orifice 60 until the valve internal pressure forces ball 58 into body 50 and compresses spring 54 to allow the flowing material to escape through outlet orifice 62.

In the event that the valve is to be employed with flammable, toxic, or other dangerous materials, holes 36, 38, 40 and 42 may be tapped, as shown in FIGURE 7, to receive threaded plugs 64 for reason of safety.

FIGURE 8 shows an alternative execution for plugging the cleaning holes, especially suitable for use in small size valves where the distance between ports 24 and 26 prohibits the fitting of plugs 64. In this execution cleaning holes 36 and 40, and 38 and 42, are combined into large diameter cleaning holes 66 and 68, respectively. Valve body 2 includes boss portion 70 and 72, through which cleaning holes 66 and 68 respectively, are drilled. Single plugs 74 and 76 are positioned in holes 66 and 68, respectively, suitably tapped to receive same.

The seal 78 housing the stem 8, and the seal 80, may be of any standard packing material; the seat rings 22 can be of known material such as rubber, Teflon synthetic rubber, etc.; and the valve body and valve ball can be of cast iron, brass, steel, stainless steels, plastics and the like; the choice of materials being dependent upon the characteristics of the material flowing in the line and the corrosiveness, erosiveness, and tendency to plug thereof.

In the foregoing description it is stated that the valve orifice ports may be inspected and cleaned without interruption of flow in the stream. This is true in the majority of executions when the diameters of ports 24 and 26 are suitably dimensioned, or countersunk as shown at 82 in FIGURE 9, to prevent any momentary shut-off. In other executions there may be a momentary shut-off when the valve is rotated through 90°. However, the time required to effect this rotation is so small and the flow resumed so quickly that the infinitesimal shut-off is insignificant and is not a factor in the flow through the line.

In the foregoing disclosure and in the accompanying drawings the valve member containing the dual orifice is shown as being spheroidal in shape and is called a valve member or ball. While this portion is also called a member or ball in the appended claims it is apparent that the valve member 14 may assume any suitable shape such as cylindrical, or tapered, etc. Without departing from the scope of the invention.

As mentioned in the foregoing, this application has been described as embodied in a specific dual-port orifice valve. However, it will be understood that the principal features of this invention may be embodied in valves having more than two orifice ports, according to design and usage requirements. For example, valve member 14 may contain a plurality of orifice ports having inserts 44 of varying orifice diameters positioned therein and which may be opened or closed to provide varying flow characteristics.

What I claim is:

1. A valve comprising a valve housing having a main inlet opening and a main outlet opening and defining a fluid flow path therebetween, a valve member in said fluid flow path of said housing and rotatable about an axis, and means for rotating said valve member about said axis, said valve member including at least two nonintersecting orifice ports through the valve member, the arrangement of the orifice ports and the shape of the inlet and outlet openings being such that by operation of said rotating means any one of said at least two orifice ports may be brought into said operative position to complete the fluid flow path, and such that when one orifice port is in the operative position the other of said at least two orifice ports is in the inoperative position free from communication with said fluid flow path, and axiliary apertures opening into and providing acress to the interior of the valve housing and free from communication with said fluid flow path, such that each of said at least two orifice ports have an aperture in communication therewith when the orifice port is in the said inoperative position.

2. A valve according to claim 1 including a pair of apertures on each side of the housing and in alignment with each end of an orifice port when the orifice port is in the inoperative position.

3. A valve according to claim 1 wherein each orifice port contains an orifice insert which may be replaced through an aligned aperture in the valve housing when the orifice port is in inorperative port-closed position without interrupting the flow through the valve member through the other orifice port.

4. A valve according to claim 1 wherein each orifice port contains a pressure relief fitting whereby to relieve excess pressure in a closed piping system.

5. A valve according to claim 1 wherein the apertures in the valve housing are tapped to receive threaded plugs.

6. A valve according to claim 1 wherein said axially rotatable valve member may be rotated a maximum of 90°.

7. A valve according to claim 1 wherein the axes of said orifice ports lie in planes substantially perpendicular to the said axis of rotation.

8. A valve according to claim 7 wherein there are two orifice ports, the axis of said orifice ports being straight lines substantially perpendicular to each other and wherein said apertures are provided on each side of the valve housing for coaxial registration with the orifice ports when in said inoperative position, whereby the orifice ports in the inoperative position may be worked upon by access from the exterior of the valve housing while the other orifice port is in the operative position.

9. A valve according to claim 8 wherein said orifice ports are enlarged at each end to provide flow through said valve in any position of said valve member.

10. A valve according to claim 8 wherein said orifice ports contain orifice inserts, which orifice inserts may be removed from the port when said port is in coarial register with said apertures, and may be replaced with orifice inserts having varying orifice diameters.

11. A valve assembly according to claim 8 wherein said rotatable valve member is a sphere.

12. A valve assembly according to claim 8 wherein said valve member may be rotated a maximum of 90°.

13. A valve assembly according to claim 8 wherein said apertures in said housing are tapped to receive threaded plugs.

14. A valve assembly according to claim 8 wherein said orifice ports are provided with pressure relief fittings.

15. A valve according to claim 8 wherein said means for axially rotating the valve member comprises a stem extending from said member exterior of said housing for attachement to a handle.

16. A valve according to claim 15 said housing being provided on its exterior with a stop abutment and the stem is provided with a skirt adapted to contact said stop abutment when the stem has been rotated through 90°.

References Cited

UNITED STATES PATENTS

| | | | |
|---|---|---|---|
| 611,392 | 9/1898 | Pike | 251—207 X |
| 1,264,775 | 4/1918 | Coles | 251—207 |
| 2,318,638 | 5/1943 | Scott | 137—240 |
| 2,621,012 | 9/1952 | Graham | 251—207 |
| 2,707,868 | 5/1955 | Goodman | 137—244 X |
| 3,228,652 | 1/1966 | Antrim | 251—315 X |
| 3,289,690 | 12/1966 | Fantz | 137—244 |
| 3,322,139 | 5/1967 | Asano | 137—242 |

FOREIGN PATENTS 1,006,997   1/1952   France.

CLARENCE R. GORDON, *Primary Examiner.*

UNITED STATES PATENT OFFICE
CERTIFICATE OF CORRECTION

Patent No. 3,386,461                      June 4, 1968

Walter Fisher

It is certified that error appears in the above identified patent and that said Letters Patent are hereby corrected as shown below:

In the heading to the printed specification, line 4, "Texaco Canadian Limited," should read -- Texaco Canada Limited, --.

Signed and sealed this 21st day of October 1969.

SEAL)
Attest:

Edward M. Fletcher, Jr.                      WILLIAM E. SCHUYLER, JR.
Attesting Officer                                Commissioner of Patents